March 7, 1961 J. F. SCOTT ET AL 2,973,678
CUTTING AND TRANSFER MECHANISM FOR GELATINOUS
TREATING APPARATUS
Filed April 25, 1957 3 Sheets-Sheet 3

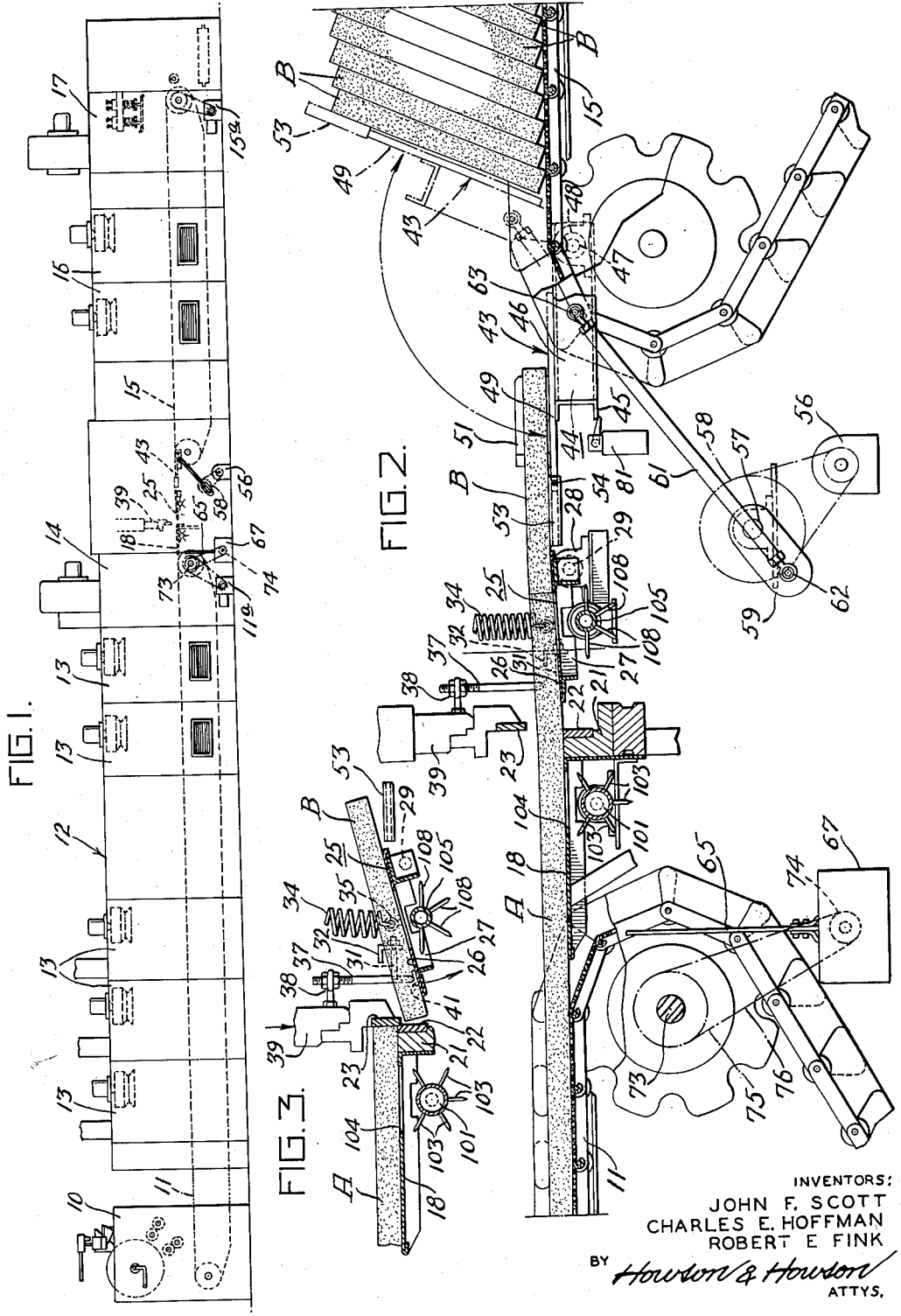

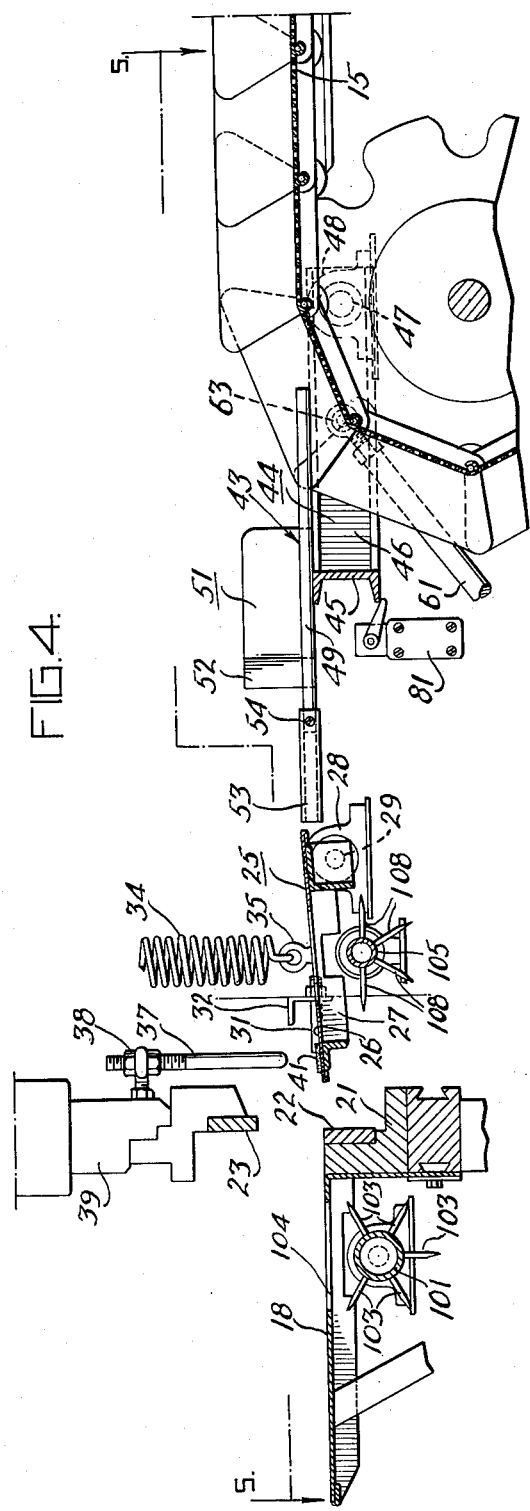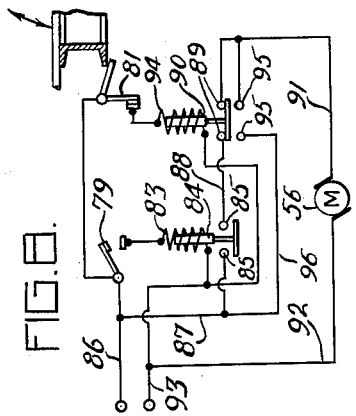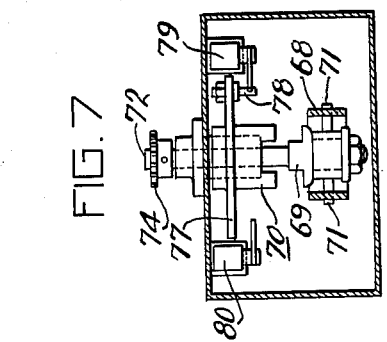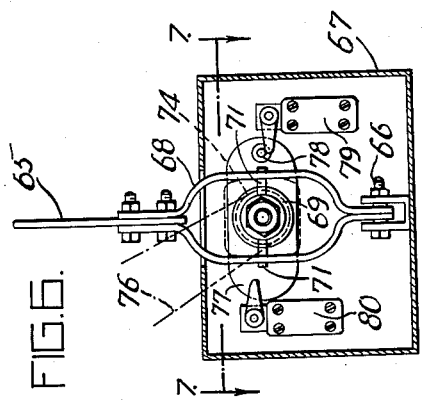
March 7, 1961 — J. F. SCOTT ET AL — 2,973,678
CUTTING AND TRANSFER MECHANISM FOR GELATINOUS TREATING APPARATUS
Filed April 25, 1957 — 3 Sheets-Sheet 2
INVENTORS:
JOHN F. SCOTT
CHARLES E. HOFFMAN
ROBERT E. FINK
BY Howson & Howson
ATTYS.

INVENTORS:
JOHN F. SCOTT
CHARLES E. HOFFMAN
ROBERT E. FINK
BY Howson & Howson
ATTYS.

United States Patent Office 2,973,678
Patented Mar. 7, 1961

2,973,678

CUTTING AND TRANSFER MECHANISM FOR GELATINOUS TREATING APPARATUS

John F. Scott, Oreland, and Charles E. Hoffman, Hatboro, Pa., and Robert E. Fink, Pennsauken, N.J., assignors to The Proctor-Silex Corporation, a corporation of Connecticut Filed Apr. 25, 1957, Ser. No. 655,052

13 Claims. (Cl. 83—96)

The present invention relates to new and useful improvements in gelatinous treating apparatus and more particularly to new and useful improvements in transfer mechanism within gelatinous material drying apparatus or similar equipment operable to receive a cut sheet of gelatinous material or the like from one conveying mechanism and transferring the same to a second conveying mechanism.

In the process of treating gelatinous material and the like, the gelatinous material is initially formed on a chill roll and thereafter removed from the chill roll, cut into a plurality of small uniform segments, and deposited on a conveyor or the like to form a continuous porous sheet of material approximately two inches thick consisting of a plurality of interlaced strips or segments of the material. This conveyor then conveys the material through a dryer housing wherein the material is dried.

In the treating of gelatinous material or the like the drying cycle takes a considerable length of time as the material may not be subjected to a high degree of heat. Accordingly, to provide efficient drying apparatus, both from the standpoint of initial cost of the drying apparatus and operating cost, it is necessary to decrease the length of travel of the material through the dryer housing. This is accomplished, according to the present invention, by passing the sheet of material approximately one-half way through the dryer housing in the form of a continuous sheet and circulating the drying medium through the material. At this point, the material is dried sufficiently so that it may be chilled and worked. After chilling the material, the material is removed from the first conveyor belt and cut transversely into segments of material approximately 18 inches wide extending transversely the entire width of the drying conveyor. These blocks are then transferred by the transfer mechanism of the present invention to the feed end of a second conveyor which completes the passage of the material through the dryer housing. The blocks are stood on their side at a small angle of inclination on the second conveyor with the successive blocks adjacent one another to form a bed of material on the second conveyor approximately 15 to 18 inches thick consisting of a plurality of rectangular blocks stood on one side adjacent one another. Because of the porous condition of the material the drying medium may still be passed through this series of blocks of material, and the second conveyor may be driven at a substantially slower rate of speed than the first conveyor to complete the drying of the material in the dryer housing of substantially shorter extent than would normally be necessary if the material was maintained in the form of a continuous flat sheet during its entire passage through the dryer.

With the foregoing in mind, the principal object of the present invention is to provide novel transfer mechanism for gelatinous material and the like operable to receive segments of material removed from a continuous sheet and stack the segments in a predetermined relation on conveying apparatus.

More specifically, an object of the present invention is to provide novel transfer mechanism within a dryer housing operable to receive a sheet of gelatinous material from a first conveyor belt, cut the same into a plurality of strips and then deposit the plurality of strips in a substantially vertical position on a second conveyor belt to thereby provide a bed of the gelatinous material on the second conveyor of substantially greater depth than the bed of the gelatinous material on the first conveyor.

A further object of the present invention is to provide novel apparatus for cutting and transferring gelatinous material and the like.

A still further object of the present invention is to provide novel transfer apparatus for gelatinous material and the like having the features and characteristics set forth which is of relatively simplified construction, may be manufactured easily and cheaply, and is entirely efficient and effective in operation and use.

These and other objects of the present invention and the various features and details of the operation and construction thereof are hereinafter more fully set forth and described with reference to the accompanying drawings in which:

Fig. 1 is a side elevational view of gelatinous material forming and drying equipment embodying the transfer apparatus of the present invention;

Fig. 2 is an enlarged fragmentary view through the transfer apparatus of the present invention in position intermediate the discharge end of one conveyor and the feed end of a second conveyor;

Fig. 3 is an enlarged fragmentary sectional view similar to Fig. 2 illustrating the position of the transfer apparatus during the cutting operation;

Fig. 4 is an enlarged sectional view of the transfer apparatus of the present invention;

Fig. 6 is a transverse sectional view of the clutch mechanism for initially actuating the transfer apparatus of the present invention;

Fig. 7 is a sectional view of the clutch mechanism taken on the line 7—7, Fig. 6; and Fig. 8 is a schematic wiring diagram of the control mechanism for the transfer apparatus of the present invention.

Figure 5:
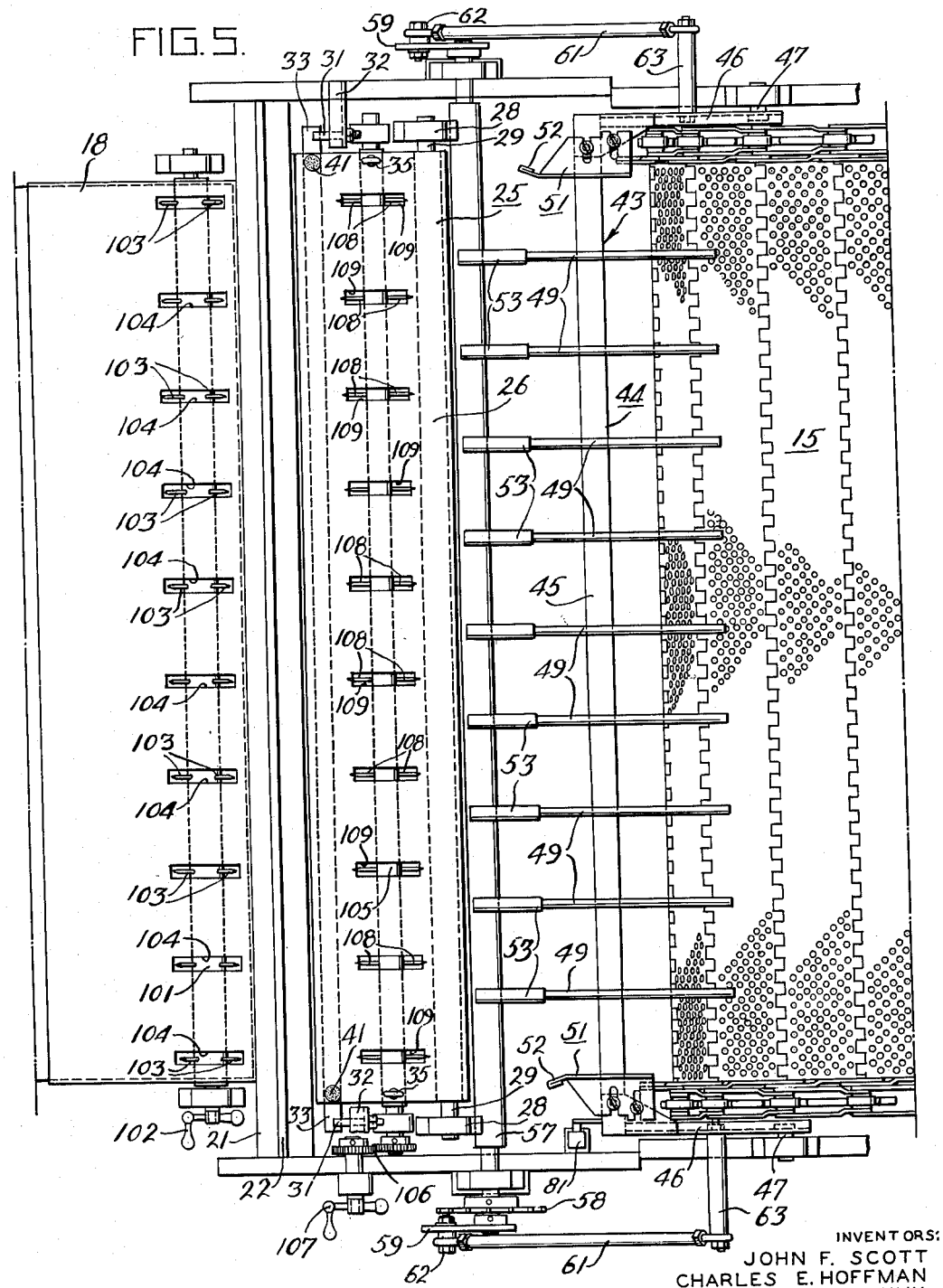
Fig. 5 is a plan view of the transfer apparatus taken on line 5—5, Fig. 4.

Referring more specifically to the drawings and particularly Fig. 1 thereof, reference numeral 10 designates generally gelatinous material forming and chilling apparatus similar to that shown and described in the copending application for Scott, Hoffman and Fink, Serial No. 640,843, filed February 18, 1957. The gelatinous chilling and forming apparatus 10 forms a continuous sheet of gelatinous material and cuts the same into a plurality of small segments which are deposited on a conveyor 11 in the form of a continuous porous sheet approximately one to two inches thick. The conveyor 11 then carries the material into a dryer designated generally as 12 whereby the material is conveyed through a series of drying chambers 13 and a cooling chamber 14 wherein the partially dried gelatinous material is cooled. The conveyor 11 terminates at the discharge end of the cooling chamber 14 and transfers the continuous sheet of gelatinous material to the cutting and transfer mechanism of the present invention (more fully described hereinafter) which cuts the continuous sheet of gelatinous material into blocks of predetermined widths and deposits the blocks on a second conveyor 15 which conveys the material through the remainder of the dryer housing.

These blocks of material formed by the cutting and transfer mechanism of the present invention are approximately 18 inches wide and are stood on end at a slight inclination on the conveyor 15 so that the conveyor 15 has a bed of material approximately 15 to 18 inches deep for the full length thereof. Because of the greater depth of the bed of material on the second conveyor 15, the conveyor 15 may be driven at a considerably slower rate of speed than the first conveyor 11 thereby maintaining the gelatinous material in the dryer housing for a longer length of time with a shorter extent of travel. The conveyors 11 and 15 are driven by separate conventional drive mechanism designated as 11a and 15a, respectively. The conveyor 15 conveys the material through final drying chambers 16 to a final chilling chamber 17 wherein the completely dried material is chilled. The dried chilled material is then passed through any conventional breaking mechanism, from which the material is transferred to further treating apparatus (not shown).

With reference now to Fig. 2, the discharge end of the first conveyor 11 feeds the flat porous sheet of material A onto a horizontal stationary table or doffer plate 18 mounted adjacent the discharge end of the conveyor 11 in the same plane as the upper run of the conveyor 11. The material A is forced over the table or doffer plate 18 by movement of the conveyor 11 and, as the material A leaves the table 18, it is passed over a bed plate 21 and stationary shear blade 22 which extends transversely of the dryer housing. Positioned upwardly adjacent the stationary shear blade 22 above the path of travel of the material A is a movable shear blade 23 which is actuatable in a vertical path of travel by means of a conventional press brake (not shown) and may be actuated downwardly at predetermined intervals to cut the continuous sheet of material A transversely into a plurality of uniform blocks of material B approximately 18 inches wide.

During forward movement of the sheet of material A over and beyond the bed plate 21 and shear blades 22 and 23, the forward end of the sheet of material A is received on a movable shear pan 25, which comprises a flat planar upper surface 26 supported by a frame 27. The frame 27 is pivotally mounted at its end, in advance of the direction of travel of the material A, transversely of the dryer housing in a pair of bearing blocks 28, 28 by means of a pair of stub shafts 29, 29 for pivotal movement about an axis extending transversely of the direction of travel of the material A between predetermined upper and lower positions.

With reference to Figs. 4 and 5, the upper limit position of the shear pan 25 is controlled by means of a pair of studs 31, 31 supported from pieces of angle iron 32, 32 extending inwardly toward the opposite side edges of the shear pan 25. The studs 31, 31 are positioned to engage outwardly projecting frame members 33, 33 of the shear pan frame 27 and limit upward movement of the shear pan 25. The shear pan 25 is normally maintained in its upper limit position by means of a pair of tightly wound coil springs 34 interconnected at their lower ends with eyes 35, 35 fixed to the movable shear pan 25. The upper ends of the coil spring 34 (not shown) may be attached in any conventional manner to a fixed portion of the housing or to a fixed portion of the support for the shear blade.

After the desired amount of the material A has passed the shear blade 22 and 23 and is supported by the movable shear pan 25, the upper shear blade 23 is actuated downwardly, as more fully described hereinafter, to cut the sheet of material A transversely into the segment B. Upon downward actuation of the upper shear blade 23 the material A is sheared between the blades 22 and 23. To prevent the material A from being crushed during the cutting operation, the movable shear pan 25 is resiliently supported as set forth above and is adapted to be moved downwardly, to the position illustrated in Fig. 3 during the cutting operation. This downward movement is effected by means of a push rod 37 adjustably mounted as indicated at 38 to the ram 39 of the press brake (not shown) which actuates the movable shear blade 23.

There is one push rod 37 at each side of the shear pan 25 and each push rod 37 engages a leather pad 41 secured to the upper surface of the shear pan immediately prior to the engagement of the sheet of material A by the movable shear blade 23. Thus, during actuation of the movable shear blade to its lower limit position the push rods 37 engage the movable shear pan 25 and pivot the shear pan 25 downwardly about the bearings 28, 28 and prevent the material A being cut from being crushed between the leading edge of the movable shear pan and the support for the movable shear blade 23. Upon upward movement of the shear blade 23, the push rods 37 are disengaged from the shear pan 25 and the coil springs 34 return the shear pan 25 to its upper limit position.

After actuation of the shear blade 23 the cut piece of material B is forced, by forward movement of the sheet of material A onto a transfer table 43 which is operable to receive the cut segments of material B and transfer the same to an angularly inclined position, as illustrated in Fig. 2, on the second conveyor 15. With reference to Figs. 2, 4 and 5, the transfer table 43 consists of a generally open U-shaped frame 44 having a central transverse frame number 45 and rearwardly extending opposite leg portions 46, 46 projecting rearwardly from the member 45 relative to the direction of travel of the material being dried. The rearwardly extending frame leg portions 46, 46 are secured to stub shafts 47, 47 mounted in bearings 48, 48 and allow pivotal movement of the transfer table about an axis extending transversely of the dryer housing.

Fixed to the upper side of the cross frame member 45 is a plurality of transfer rods 49 which extend longitudinally of the dryer housing and in one position of the transfer table are in substantial alignment with the upper surface 26 of the movable shear pan 25. A pair of adjustable guide plates 51, 51 having outwardly flared leading edges 52, 52 are secured to the opposite ends of the cross member 45 and guide the cut pieces of material B onto the transfer rods and center the cut piece of material B on the transfer table.

The ends of the transfer rods 49 adjacent the movable shear pan 25 have adjustable rod extensions 53 thereon which fit over the outer end of each transfer rod 49 and are adjustably secured thereto, for example by means of a set screw 54, as shown in Fig. 4. These adjustable rod extensions 53 permit adjustment of the length of the transfer table in the longitudinal direction of the dryer housing and are adjusted so that there is a minimum gap between the forward end of the transfer table 43 and the rear edge of the movable shear pan 25.

Referring now to Fig. 2, the transfer table 43 is pivotally mounted as set forth previously for movement between upper and lower limit positions. In the lower limit position, the transfer table is in substantial alignment with the movable shear pan; while in the upper or raised limit position thereof, the transfer table is in the position illustrated in broken lines in Fig. 2 wherein the transfer rods 49 pass through and beyond a vertical position and are inclined at an angle of approximately 70 degrees to the horizontal. Movement of the transfer table between its lower and upper limit positions is effected by means of an electric motor 56 which causes rotation of a shaft 57 by means of a conventional sprocket and drive gear 58. The shaft 57 extends transversely of the dryer housing beneath the transfer table 43 and carries, at its opposite ends, crank arms 59, 59. An adjustable connecting rod 61 is pivotally secured to each crank arm 59, as indicated at 62, 62 and the opposite end of each connecting rod 61 is pivotally secured to studs 63, 63 projecting outwardly from opposite sides of the rearwardly extending leg portions 46 of the frame of the transfer table. By this construction, during each revolution of the shaft 57 the transfer table 43 is moved from its lower limit position to its upper limit position and then back down to its lower limit position. Accordingly, after the shear blade cuts a piece of material B, the material B is forced over the movable shear pan onto the transfer table 43. The table 43 is then actuated, as more fully described hereinafter, to its upper limit position where it deposits the cut piece of material on the second conveyor 15, and the transfer table is then returned to its lower limit position to receive a second piece of material B. It will be apparent from the above that due to the operation of the shear blade and transfer table the bed of material on the second conveyor 15 is substantially thicker than the bed of material on the first conveyor 11. Accordingly, the second conveyor 15 is driven at a much slower rate of speed than the first conveyor 11 thereby decreasing the extent of the length of travel of the material through the dryer housing yet maintaining the material within the dryer housing long enough for the material to be thoroughly dried. The cut pieces of material B will remain in their substantially vertical position resting on one side edge as shown in Fig. 2 due to the fact that each piece of material B lies against each preceding piece. When the material is initially started through the dryer, the first few pieces of material deposited on the conveyor 15 will assume a horizontal position lying on top of one another, but subsequent pieces of the cut material will rest against these initially cut pieces and will assume the position as shown in Fig. 2.

Figs. 2, 6, 7 and 8 disclose the control mechanism for initially starting operation of the shear blade and transfer table and for automatically actuating the same after the operation has been started. When the dryer is initially started and the gelatinous material, or other material to be dried, is starting its path of travel through the dryer the shear blade 23 and transfer table 43 are not operating. The operator of the machine will manually start operation of the shear blade and transfer table when the leading edge of the material being treated in the dryer reaches the end of the first conveyor 11. At this time, the operator of the machine will move a shift lever 65 inwardly toward the conveyor 11 thereby starting actuation of the movable shear blade 23 and transfer table 43. The shift lever 65 is pivoted, as indicated at 66, to the base of an enclosed housing 67 mounted outwardly adjacent the dryer 12 at the discharge end of the first conveyor 11. A yoke 68 is formed integrally with the bottom portion of the shift lever 65 and passes outwardly adjacent opposite sides of the movable member 69 of a conventional spiral jaw clutch 70. The yoke 68 is interconnected with a movable member 69 of the clutch 70 by means of a pair of pins 71, 71 carried by the yoke and extending inwardly into engagement with the member 69. The movable member 69 and clutch 70 are carried by a continuously rotating shaft 72 which is drivably connected with the shaft 73 at the discharge end of the conveyor 11 by means of a pair of sprockets 74 and 75 and a drive chain 76.

Upon inward movement of the shift lever 65 and movable clutch member 69, the clutch 70 is caused to rotate in the clockwise direction, relative to Fig. 6, thereby causing similar rotation of a timing disk 77 carried by the clutch 70. The timing disk 77 carries a switch actuating member 78 thereon operable to momentarily engage and actuate a pair of micro switches 79 and 80 secured to the walls of the housing 67. In the start position of the timing disk 77, the switch actuating member 78 is in the position shown in Fig. 6 and the switch 79 is the first switch to be actuated by the actuating member 78. The switch 79 starts actuation of the electric motor 56 which controls movement of the transfer table 43, while the switch 80 starts actuation of the press brake and causes downward movement of the shear blade 23.

This timing disk and switch actuating member causes actuation of the transfer table 43 when the cut piece of material B is in the position shown in Fig. 2 with the trailing edge of the cut piece of material B overhanging the rear end of the transfer table 43 relative to the direction of travel of the material. Thus, the transfer table may be raised to the position shown in broken lines to deposit the cut piece of material B on the second conveyor 15 and lowered to the position shown in full lines before the leading edge of the next piece of material reaches the end of the movable shear pan 25. A third micro switch 81 is provided which is mounted beneath the cross member 45 of the transfer table 43 and is actuated to a closed position when the transfer table reaches its lower limit position. This micro switch 81, when closed, stops actuation of the drive motor 56 for the transfer table.

Fig. 8 is a schematic wiring diagram of the electric circuit for controlling operation of the motor 56 for the transfer table 43. In the "at rest" position of the transfer table the circuit is in the position shown in Fig. 8, with the micro switch 79 opened and the micro switch 81 held closed by the cross frame member 45 of the transfer table. Upon actuation of the switch 79 to the closed position by the switch actuating member 78 a circuit is momentarly completed through the solenoid 83 of a relay 84.

Upon energization of the solenoid 83 of the relay 84 the relay 84 is raised to its upper position thereby completing a circuit through a pair of contacts 85. This, in turn, completes a circuit through the motor 56 thereby starting operation of the motor 56. The circuit for the motor 56 is from one side of the line 86, through the lead wire 87, the contacts 85, 85 of the relay 84, the lead wire 88, the upper contact 89, 89 of a second relay 90, the lead wire 91, through the motor 56 and the lead 92 to the other side of the line 93. As set forth previously, the micro switch 81 is normally open and maintained in a closed position by the cross frame member 45 of the transfer table. With the micro switch 81 closed, the solenoid coil 94 of the relay 90 is maintained energized thereby completing a circuit through the upper contact 89, 89 of the solenoid 90. When the switch 81 is open and the solenoid coil 94 de-energized, a circuit is completed through the contacts 95, 95.

After the motor 56 has been started, the switch 81 is opened and the solenoid coil 94 is de-energized thereby breaking the circuit through the contacts 89, 89 and completing a circuit through the circuit 95, 95. Thus, the circuit for the motor 56 is momentarily broken but immediately completed again through the contacts 95, 95. This circuit for the motor 56 is from one side of the line 86, through the feed 87, the lead 96, the contacts 95, 95 and then through the lead 91, motor 56, lead 92 to the other side of the line 93. The operation of the motor 56 and timing disk 77 is such that the switch 79 is not disengaged by the switch operating member 78 of the timing disk 77 until after the switch 81 has been opened, thus, completing the motor circuit through the contacts 95, 95. Thereafter, the switch 79 is permitted to open and opening of the switch 79 with the subsequent de-energization of the solenoid 83 does not effect operation of the motor. After the transfer table has completed one cycle of operation the switch 81 is again contacted and closed by the cross frame member of the transfer table. This energizes the coil 94 of the relay 90 thereby breaking the circuit to the motor 56 and stopping operation of the motor 56. The circuit is then in the position shown in Fig. 8 and is prepared to complete another cycle of operation of the motor 56 upon closing of the switch 79 by the timing disk and switch actuating member.

After the switch 79 is closed and opened, the switch actuating member 78 actuates the switch 80 to cause one cycle of operation of the movable shear blade 23 thereby cutting a piece of material B of proper dimensions for reception on the transfer table 43. This cutting and transfer operation is continued until the shift lever 65 is moved manually to the disengaged position to stop rotation of the timing disk 77.

At the end of a run of material through the dryer housing, it will be necessary to manually move the trailing portion of the material being treated through the transfer and cutting section set forth above. It is necessary to do this, as the material is forced through the cutting and transfer section by the movement of the conveyor 11 and after the trailing edge of the material leaves the conveyor 11 there will be a short segment of the material at the transfer and cutting section. This material is moved manually through the dryer by means of rotatably mounted shaft 101 extending transversely beneath the table 18 and having a hand wheel 102 secured to its outer end to permit the operator of the machine to rotate the shaft 101. This shaft 101 has a plurality of pins 103 thereon about the lower portion of its periphery which are adapted to be projected upwardly through a slot 104 in the table 18 upon rotation of the shaft 101 in the clockwise direction relative to Fig. 2 and engage the lower surface of the material on the table 18 and force the same forwardly. The material on the table 18 is moved forwardly manually in this manner by the operator of the machine until it has reached the desired position beneath the shear blade 23 and the shear blade 23 is then actuated by causing the switch 89 to be closed. The switch 89 may be closed by the operator engaging the shift lever 65 and causing the timing disk 77 to rotate one complete cycle. After the material has been cut the operator may again cause rotation of the shaft 101 by means of the handwheel 102 to force the cut segment of material onto the transfer table and bring the remaining portion of the material to the desired position beneath the movable shear blade 23. The operator of the machine then again causes operation of the movable shear blade thereby cutting the material and transferring the cut pieces of material to the second conveyor 15. After the last piece of that portion of material which must be moved manually through the machine is cut, the operator of the machine must manually move this last piece from the movable shear pan 25 to the transfer table 43. This is accomplished by means of a rotatable shaft 105 extending transversely of the dryer beneath the movable shear pan 25 and connected by means of gearing 106, as illustrated in Fig. 5, to a rotary handwheel 107. A plurality of pins 108 are secured to the shaft 105 at the lower portion of its periphery and are adapted, upon rotation of the shaft 105 in the clockwise direction relative to Fig. 2, to be projected upwardly through slot openings 109 in the upper surface 26 of the movable shear pan 25 into engagement with the material carried thereon and move the material from the movable shear pan 25 to the transfer table 43. The operator of the machine may then cause actuation of the transfer table 43 as described above to remove this last piece of material from the transfer section of the dryer. After this last piece of cut material B is conveyed entirely through the dryer by the second conveyor 15, the dryer may be shut down or may be prepared for treating another batch of material.

From the foregoing it will be apparent that the present invention provides novel cutting and transfer mechanism for gelatinous treating apparatus which is operable to receive a continuous sheet of material from a first conveying means, cut the continuous sheet of material into a plurality of uniform segments and thereafter transfer the segments to a second conveying means to form a bed of material on the second conveying means of substantially greater depth than the bed of material on the first conveying means. In addition, it will be apparent that the present invention provides novel transfer mechanism operable to receive uniform segments of material and stack the segments of material on a conveyor with the segments of the material standing on one side edge and inclined forwardly at a slight angle.

While particular embodiments of the present invention have been illustrated and described herein it is not intended to limit the invention to such a disclosure and changes and modifications may be incorporated and embodied therein within the scope of the following claims.

We claim:

1. Apparatus for treating gelatinous material and the like comprising; first conveying means operable to convey a continuous sheet of material to be treated, second conveying means having its feed end spaced longitudinally from the discharge end of said first conveying means, a shear blade mounted adjacent the discharge end of said first conveying means operable to cut said continuous sheet of material into a plurality of uniform segments, a doffer plate positioned intermediate said shear blade and said first conveying means operable to engage the material at the discharge end of said first conveying means and guide the same to said shear blade, a shear pan positioned adjacent said shear blade at the opposite side of said shear blade from said first conveying means operable to receive the material cut by said shear blade, means mounting said shear pan for movement from a first limit position substantially in alignment with said doffer plate to a second limit position spaced downwardly from said first limit position, a transfer table positioned intermediate said shear pan and said second conveying means, means pivotally mounting said transfer table adjacent the feed end of said second conveyor for pivotal movement from a plane substantially parallel to the plane of said first conveying means to a position upwardly adjacent said second conveying means, said transfer table operable to receive the cut pieces of material from said shear pan while in said first limit position and deposit the cut pieces of material on said second conveying means upon movement to said second limit position, and means operable to actuate said transfer table from said first position to said second position after operation of of said shear blade.

2. Apparatus in accordance with claim 1 wherein said shear pan extends transversely for the full width of the material being cut, and means pivotally mounting said shear pan transversely of the material being cut for pivotal downward movement upon actuation of the shear blade.

3. Apparatus in accordance with claim 2 wherein resilient spring means are provided interconnected with said shear pan operable to resiliently urge said shear pan upwardly.

4. Apparatus for treating gelatinous material and the like comprising; first conveying means operable to convey a continuous sheet of material to be treated, second conveying means positioned in alignment with said first conveying means having its feed end spaced longitudinally from the discharge end of said first conveying means, a shear blade mounted adjacent the discharge end of said first conveying means operable to cut said continuous sheet of material into a plurality of uniform segments, a doffer plate positioned intermediate said shear blade and said first conveying means operable to engage the material at the discharge end of said first conveying means and guide the same to said shear blade, a shear pan positioned adjacent said shear blade at the opposite side of said shear blade from said first conveying means operable to receive the material cut by said shear blade, means mounting said shear pan for movement from a first limit position substantially in alignment with said doffer plate to a second limit position spaced downwardly from said first limit position, a transfer table positioned intermediate said shear pan and said second conveying means, means pivotally mounting said transfer table adjacent the feed end of said second conveyor for pivotal movement from a plane substantially parallel to the plane of said first conveying means to a position upwardly adjacent said second conveying means, said transfer table operable to receive the cut pieces of material from said shear pan while in said first limit position and deposit the cut pieces of material on said second conveying means upon movement to said second limit position, first control means operable to actuate said shear blade at predetermined regular intervals in timed relation with the feed of said first conveying means to cause said shear blade to cut said material into a series of uniform segments, and second control means operable to actuate said transfer table from said first to said second position at a predetermined timed interval after actuation of said shear blade.

5. Apparatus for treating gelatinous material and the like comprising; first conveying means operable to convey a continuous sheet of material to be treated, second conveying means positioned in alignment with said first conveying means having its feed end spaced longitudinally from the discharge end of said first conveying means, a shear blade mounted adjacent the discharge end of said first conveying means operable to cut said continuous sheet of material into a plurality of uniform segments, a doffer plate positioned intermediate said shear blade and said first conveying means operable to engage the material at the discharge end of said first conveying means and guide the same to said shear blade, a shear pan positioned adjacent said shear blade at the opposite side of said shear blade from said first conveying means operable to receive the material cut by said shear blade, means mounting said shear pan for movement from a first limit position substantially in alignment with said doffer plate to a second limit position spaced downwardly from said first limit position, a transfer table positioned intermediate said shear pan and said second conveying means, means pivotally mounting said transfer table adjacent the feed end of said second conveyor for pivotal movement from a plane substantially parallel to the plane of said first conveying means to a position upwardly adjacent said second conveying means, said transfer table operable to receive the cut pieces of material from said shear pan while in said first limit position and deposit the cut pieces of material on said second conveying means upon movement to said second limit position, control means comprising a continuously rotating timing disk drivably connected with said first conveying means, and actuating means interconnected with said timing disk operable to actuate said shear blade at predetermined regular intervals to cut said material and actuate said transfer table at uniform interval after actuation of said shear blade to move said transfer table from said first position to said second position.

6. Apparatus in accordance with claim 1 wherein a rotatable feed wheel is positioned beneath said doffer plate, means defining a plurality of slot openings in said doffer plate, and prongs on said feed wheel operable upon rotation of said feed wheel to extend upwardly through said doffer plate slot opening into engagement with the material on said doffer plate to advance the material across said doffer plate.

7. Apparatus in accordance with claim 1 wherein a rotatable feed wheel is positioned beneath said shear pan, means defining a plurality of slot openings in said shear pan, and prongs secured to said feed wheel operable upon rotation thereof to project upwardly through said shear pan slot openings into engagement with the material thereon to advance the same across said shear pan.

8. In treating apparatus of the type described for treating gelatinous material and the like, feed means to feed gelatinous material forwardly at a uniform rate, a stationary shear blade positioned beneath the path of travel of the material, a vertically movable shear blade mounted above the path of travel of the material cooperatively associated with said stationary shear blade and operable to cut the material into a plurality of uniform segments, a shear pan mounted adjacent said stationary shear blade operable to receive the cut segments of material from said shear blades and support the cut segments of material in the path of travel of the material, means pivotally mounting said shear pan for pivotal movement about a point spaced from said stationary shear blade, resilient means normally maintaining said shear pan in a position adjacent said stationary shear blade, and a member carried by said movable shear blade operable to engage said shear pan during downward movement of said movable shear blade and force said shear pan downwardly below said stationary shear blade.

9. In apparatus for treating gelatinous material and the like comprising first and second conveying means with the first conveying means operable to convey a sheet of material and the second conveying means having its feed end spaced longitudinally from the discharge end of the first conveying means; a shear blade mounted adjacent the discharge end of said first conveying means operable to cut said continuous sheet of material into a plurality of uniform segments, said shear blade extending transversely of the path of said sheet material for the full width of the material, a doffer plate positioned intermediate said shear blade and said first conveying means operable to engage and remove the sheet of material from said first conveying means and guide to the same to said shear blade, a shear pan positioned adjacent said shear blade at the opposite side of said shear blade from said first conveying means to support the material cut by said shear blade, said shear pan extending transversely of the path of travel of said material for the full width of the material, means pivotally mounting said shear pan transversely of the material being cut for pivotal downward movement upon actuation of said shear blade, resilient spring means being interconnected with said shear pan operable to resiliently urge said shear pan upwardly, a transfer table mounted intermediate said shear pan and said second conveying means for movement between opposite limit positions and operable to receive the cut segments of material from said shear pan in one of said limit positions and transfer the same to said conveying means in the other limit position thereof, and means operable to actuate said transfer table to said other limit position after operation of said shear blade.

10. Apparatus in accordance with claim 9 wherein a member is carried by said shear blade operable to engage said shear pan during the cutting stroke of said shear blade to thereby force said shear pan downwardly.

11. Apparatus for treating gelatinous material and the like comprising; first and second treating chambers within which said material is treated, a first endless conveyor operable to convey a continuous sheet of said material through said first treating chamber, a second endless conveyor positioned substantially in alignment with said first conveyor and having its feed end spaced longitudinally from the discharge end of the first conveyor operable to convey said material through said second treating chamber, said first and second conveyors being operable to convey said material in a single direction along a substantially horizontal plane, a shear blade mounted adjacent the discharge end of said first conveyor operable to cut said continuous sheet of material transversely into a plurality of segments with said segments having a greater dimension in the direction of travel of said first conveyor than the thickness of said continuous sheet of material, drive means operable to drive said first and second conveyors in the same direction with said second conveyor being driven at a slower rate of speed than said first conveyor, a transfer table mounted intermediate said shear blade and the feed end of said second conveyor for movement between a first limit position wherein said transfer table is in substantial alignment with said sheet of material carried by said first conveyor and a second limit position wherein said transfer table overlies the feed end of said second conveyor at an acute angle to the path of travel of said sheet of material and said second conveyor, and means to actuate said transfer table from said first limit position to said second limit position after operation of said shear blade and after said transfer table receives the cut segments of material from said shear blade to deposit the cut segments of material on said second conveyor in a position wherein said cut segment of material is supported by its cut edge.

12. Apparatus in accordance with claim 11 wherein said transfer table is pivotally mounted adjacent the feed end of said second conveyor for pivotal movement between said first and second limit positions and wherein upon movement from said first limit position to said second limit position said transfer table is pivoted upwardly through an angle of more than 90° to deposit the cut segments of material on said second conveyor with said segments supported on their cut edge.

13. Apparatus in accordance with claim 11 wherein a shear pan is mounted intermediate said shear blade and said transfer table operable to receive the cut segments of material from said shear blade and support the cut segments of material in the path of travel of said sheet of material.

References Cited in the file of this patent

UNITED STATES PATENTS

| | | |
|---|---|---|
| 1,412,225 | Winkley | Apr. 11, 1922 |
| 2,012,561 | Grupe | Aug. 27, 1935 |
| 2,263,207 | Coumbe et al. | Nov. 18, 1941 |
| 2,538,972 | Magnani | Jan. 23, 1951 |
| 2,654,415 | Benedict | Oct. 6, 1953 |
| 2,661,707 | Clement | Dec. 8, 1953 |
| 2,682,344 | Preis et al. | June 29, 1954 |
| 2,742,087 | Smith et al. | Apr. 17, 1956 |